(12) United States Patent
Fazal

(10) Patent No.: US 9,768,877 B2
(45) Date of Patent: Sep. 19, 2017

(54) MULTI-BIT DIGITAL TO ANALOG-OPTICAL CONVERTER

(71) Applicant: Irfan Muhammad Fazal, Ottawa (CA)

(72) Inventor: Irfan Muhammad Fazal, Ottawa (CA)

(73) Assignee: Huawei Technologies Co., Ltd., Shenzhen, Guangdon (CN)

( * ) Notice: Subject to any disclaimer, the term of this patent is extended or adjusted under 35 U.S.C. 154(b) by 54 days.

(21) Appl. No.: 15/004,298

(22) Filed: Jan. 22, 2016

(65) Prior Publication Data

US 2017/0214471 A1     Jul. 27, 2017

(51) Int. Cl.
*H04B 10/556*  (2013.01)
*H04B 10/2575* (2013.01)
*H04J 14/02*   (2006.01)
*H04Q 11/00*   (2006.01)

(52) U.S. Cl.
CPC ... *H04B 10/5561* (2013.01); *H04B 10/25752* (2013.01); *H04J 14/02* (2013.01); *H04Q 2011/0016* (2013.01)

(58) Field of Classification Search
CPC ....... H04Q 2011/0016; H04Q 11/0005; H04Q 11/0062; H04Q 11/0001; H04J 14/02; H04J 14/0212; H04J 14/0227; H04B 10/25752; H04B 10/5561
See application file for complete search history.

(56) References Cited

U.S. PATENT DOCUMENTS

| | | | |
|---|---|---|---|
| 5,999,284 A * | 12/1999 | Roberts | G02F 3/00 250/227.27 |
| 2005/0100281 A1* | 5/2005 | Kim | G02F 1/0123 385/39 |
| 2006/0078336 A1 | 4/2006 | McNicol et al. | |
| 2008/0025729 A1 | 1/2008 | Funada | |
| 2011/0002696 A1* | 1/2011 | Kang | H04B 10/5053 398/175 |
| 2012/0032827 A1 | 2/2012 | Porzi et al. | |
| 2014/0211210 A1 | 7/2014 | Croker et al. | |

FOREIGN PATENT DOCUMENTS

| | | |
|---|---|---|
| JP | 2014007642 | 1/2014 |
| WO | 2015138106 | 9/2015 |

OTHER PUBLICATIONS

Liao et al., "Novel Photonic Radio-frequency Arbitrary Waveform Generation based on Photonic Digital-to-Analog Conversion with Pulse Carving", 2015 Conference on Lasers and Electro-Optics (CLEO), San Jose, CA, May 2015, pp. 1-2.

(Continued)

*Primary Examiner* — Ted Wang
(74) *Attorney, Agent, or Firm* — Gowling WLG (Canada) LLP

(57) ABSTRACT

A digital-electrical to digital-optical converter converts the digital electric signal to a plurality of digital-optical signals. The plurality of digital signals are used in controlling one or more cross phase modulator semiconductor optical amplifiers (XMP-SOAs) in order to modulate a continuous wave optical signal and produce an analog-optical signal corresponding to the digital-electrical signals.

24 Claims, 11 Drawing Sheets

(56) References Cited

OTHER PUBLICATIONS

Yu et al., "All-optical phase conjugation using a 90 degree optical hybrid and nested SOA-MZIs," Optical Fiber Communication Conference and Exposition and the National Fiber Optic Engineers Conference (OFC/NFOEC), 2013, Anaheim, CA, Mar. 2013, pp. 1-3.
Uenohara et al., "Hybrid integrated semiconductor optical amplifier-Mach Zehnder interferometer (SOA-MZI)-type all-optical wavelength converter with a selectable delay time push-pull configuration", Opto-Electronics and Communications Conference (OECC), 2012 17th, Busan, Jul. 2012, pp. 817-818.
Hisano et al., "Wavelength Multicasting Accompanied With All-Optical Modulation Format Conversion from NRZ-OOK to RZ-BPSK using SOA-MZI Wavelength Converter", 17th Opto-Electronics and Communications Conference (OECC 2012) Technical Digest, Jul. 2012, Busan, Korea, pp. 897-898.
Oda, et al., "All-Optical Digital-to-Analog Conversion Using Nonlinear Optical Loop Mirrors", IEEE Photonics Technology Letters, vol. 18, No. 5, Mar. 1, 2006, pp. 703-705.
Anis, et al., "Defragmentation and Grooming on 85.4 Gb/s by Simultaneous Format and Wavelength Conversion in an Integrated Quad SOA-MZI", 2012 16th International Conference on Optical Network Design and Modeling (ONDM), Colchester, 2012, pp. 1-6.
International Search Report and Written Opinion for corresponding International PCT Appl. No. PCT/CN2016/074040 dated May 5, 2016.
English Abstract of cited reference JP2014007642.

\* cited by examiner

MULTI-BIT DIGITAL TO ANALOG-OPTICAL CONVERTER

TECHNICAL FIELD

The current disclosure relates to optical networks and in particular to a multi-bit digital-electrical to analog-optical converter.

BACKGROUND $5^{th}$ generation, or 5G, cellular service will require several GHz of bandwidth to be supplied to individual cellular antennas. Radio over fiber (RoF) technology has the ability to scale to such high bandwidth requirements due to the THz of bandwidth provided by fiber optic cables. The fiber channel can also provide wavelength division multiplexing to accommodate a high number of wireless channels. Transmitting analog signals directly to a cellular antenna for transmission into free-space instead of transmitting digital data to the antenna and then converting the digital data to analog at the top of the antenna has an advantage of removing complexity from the remote antenna. In such RoF transmission systems, the digital to analog conversion may be done at a central office or at a remote distribution unit and an optical detector at top transmitter's antenna converts the transmitted RF optical signal to an RF electrical signal for use in driving the antenna.

Several techniques have been proposed for the digital to analog conversion/modulation for use in RoF transmission systems. Some silicon photonics based modulators use the radio frequency (RF) digital electrical signals to directly control multiple phase shifters in an arm of a Mach-Zehnder interferometer (MZI) structure, which results in modulating an amplitude of the output optical signal. However, incorporating the electrically controlled phase shifters into a single MZI structure requires the individual phase shifters to be disposed in a close physical proximity to each other, which may result in crosstalk between the RF signals applied to individual phase shifters. Other modulators may reduce the RF crosstalk by using separate optical wavelengths for each digital bit stream, which allows the RF electrical bit signals to be physically separated; however such modulation results in spectral inefficiency since each individual bit stream is modulated by a separate wavelength and as such a multi-bit signal will be modulated on multiple different wavelengths. Further, walk-off between different wavelengths over a long length of fiber would require compensation, increasing the system complexity.

An additional, alternative and/or improved digital to analog modulator for use in converting a multi-bit digital electrical signal to a corresponding analog optical signal is desired.

SUMMARY

In accordance with the present disclosure there is provided a digital-electrical to analog-optical converter for converting an input digital electrical signal into an output analog optical signal, the converter comprising: a plurality of light paths, wherein each light path is configured for modulating a respective optical pump signal according to a respective bit of the input digital electrical signal; and a Mach-Zehnder interferometer comprising at least one cross-phase modulation (XPM) semiconductor optical amplifier (SOA) coupled to the plurality of light paths to induce an optical phase shift between arms of the Mach Zehnder interferometer for providing the output analog optical signal.

In a further embodiment, the digital-electrical to analog-optical converter comprises an optical power combiner coupled to the plurality of light paths for combining the plurality of modulated optical pump signals to a single optical pump signal, wherein the at least one XPM-SOA is coupled to the single optical pump signal.

In a further embodiment of the digital-electrical to analog-optical converter, the at least one XPM-SOA comprises a plurality of XPM-SOAs, wherein each one of the XPM-SOAs is coupled to a respective one of the plurality of modulated optical pump signals.

In a further embodiment of the digital-electrical to analog-optical converter, each one of the plurality of light paths corresponds to a bit significance of a bit of the input digital electrical signal, each light path having an optical switch controllable by a bit of the input digital electrical signal of the corresponding bit significance of the light path for modulating the respective optical pump signal.

In a further embodiment, the digital-electrical to analog-optical converter further comprises a light source for providing the plurality of optical pump signals.

In a further embodiment, the digital-electrical to analog-optical converter further comprises an optical splitter for splitting an optical beam of the light source into the plurality of optical pump signals.

In a further embodiment of the digital-electrical to analog-optical converter, the optical splitter is configured for splitting the optical beam with power splitting ratios corresponding to the bit significance of the corresponding light path.

In a further embodiment, the digital-electrical to analog-optical converter further comprises a plurality of optical attenuators, wherein each optical attenuator is disposed in a respective one of the plurality of light paths for attenuating the respective optical pump signal to a level corresponding to the bit significance of the light path.

In a further embodiment of the digital-electrical to analog-optical converter, the light source comprises a plurality of laser diodes each of the laser diodes coupled to a respective one of the plurality of light paths, wherein each laser diode has an output power level corresponding to the bit significance of the corresponding light path.

In a further embodiment of the digital-electrical to analog-optical converter, each one of the XPM-SOAs has a phase modulation efficiency corresponding to the bit significance of the corresponding light path.

In a further embodiment, the digital-electrical to analog-optical converter further comprises a digital-electrical to digital-optical converter comprising the plurality of light paths; and a digital-optical to analog-optical modulator comprising the at least one XPM SOA.

In a further embodiment of the digital-electrical to analog-optical converter, the digital-electrical to digital-optical converter is optically coupled to the digital-optical to analog-optical modulator via at least one fiber optic cable or waveguide.

In a further embodiment of the digital-electrical to analog-optical converter, each of the at least one XPM-SOA is located in a single arm of the arms of the Mach-Zehnder interferometer.

In a further embodiment of the digital-electrical to analog-optical converter, each of the at least one XPM-SOA is a counter-propagating XPM-SOA.

In a further embodiment, the digital-electrical to analog-optical converter further comprises an optical isolator located between each one of the at least one XPM-SOA.

In a further embodiment of the digital-electrical to analog-optical converter, each of the at least one XPM-SOA is a co-propagating XPM-SOA.

In a further embodiment, the digital-electrical to analog-optical converter further comprises an optical filter located downstream of each one of the at least one XPM-SOA for filtering a wavelength of the optical pump signals.

In a further embodiment of the digital-electrical to analog-optical converter, each one of the at least one XPM-SOA induces a respective phase shift in a probe optical signal based on the respective amplitude of the associated modulated optical pump signal.

In a further embodiment of the digital-electrical to analog-optical converter, a combined phase shift induced by the at least one XPM-SOAs is between 0 and $\pi$.

In a further embodiment of the digital-electrical to analog-optical converter, the phase shift induced by the at least one XPM-SOA associated with the respective light path is approximately $$\frac{\pi}{2^{m-n}},$$

where m is a number of digital bits and n is the bit significance of the respective light path with n=0 being a least significant bit and n=m−1 being a most significant bit.

In a further embodiment, the digital-electrical to analog-optical converter further comprises a light source providing the optical probe signal to the MZI structure.

In accordance with the present disclosure there is further provided a radio over fiber (RoF) system for transmitting at least one analog radio-frequency signal to a transmission location, the RoF system comprising: a plurality of digital-electrical to analog-optical converters, each of the digital-electrical to analog-optical converters comprising: a plurality of light paths, wherein each light path is configured for modulating a respective optical pump signal according to a respective bit of the input digital electrical signal; and a Mach-Zehnder interferometer comprising at least one cross-phase modulation (XPM) semiconductor optical amplifier (SOA) coupled to the plurality of light paths to induce an optical phase shift between arms of the Mach Zehnder interferometer for providing the output analog optical signal; a wavelength multiplexer for multiplexing the plurality of output analog optical signals from the plurality of digital-electrical to analog-optical converters into a multiplexed optical signal; a wavelength demultiplexer for demultiplexing the multiplexed optical signal into the plurality of output analog optical signals; and an optical fiber for optically coupling the wavelength multiplexer to the wavelength demultiplexer for carrying the multiplexed optical signal.

In a further embodiment of the RoF system, the optical fiber is between 500 m and 20 km in length.

In a further embodiment, the RoF system comprises between 2 and 128 digital-electrical to analog-optical converters.

In accordance with the present disclosure there is further provided a digital-optical to analog-optical modulator comprising: a plurality of cross-phase modulation (XPM) semiconductor optical amplifiers (SOAs) arranged within a Mach-Zehnder interferometer (MZI) structure, each of the XPM-SOAs associated with a respective one of a plurality of digital-optical signals each of the plurality of optical signals representing a digital bit stream with each signal having a normalized amplitude representing a digital '0' of approximately 0 and a normalized amplitude representing a digital '1' of approximately $$\frac{1}{2^{m-n}},$$

where m is a number of digital bits and n is an index of the digital bit controlling the respective light path with n=0 indexing a least significant bit and n=m−1 indexing a most significant bit.

In accordance with the present disclosure there is further provided a digital-electrical converter comprising: a plurality of light paths each of the light paths comprising an optical switch controlled by a respective bit of a multi-bit digital electrical data signal and providing a respective one of a plurality of digital-optical signals each of the plurality of optical signals representing a digital bit stream with each signal having a normalized amplitude representing a digital '1' of approximately 0 and a normalized amplitude representing a digital '0' of approximately $$\frac{1}{2^{m-n}},$$

where m is a number of digital bits and n is an index of the digital bit controlling the respective light path with n=0 indexing a least significant bit and n=m−1 indexing a most significant bit.

BRIEF DESCRIPTION OF THE DRAWINGS

Embodiments are described herein with reference to the appended drawings, in which.

DETAILED DESCRIPTION

A digital-electrical to analog-optical converter is described herein that provides an analog optical signal that corresponds to a digital electrical signal. The converter is described with particular reference to its use in a radio-over-fiber (RoF) application; however, it may be used in other applications in which it is desirable to carry an analog version of a digital signal over a fiber optic cable. The converter described herein provides low RF crosstalk by providing physical separation between RF electrical signals. The converter does not rely on electrically controlled phase-shifters located in an arm of a Mach-Zehnder interferometer (MZI) and as such, it is possible to provide sufficient physical separation between the electrical signals to reduce the RF crosstalk to acceptable or desired levels. Further, the converter described herein may provide high spectral efficiency since each multi-bit RF electrical signal can be modulated on a single wavelength, allowing multiple modulated multi-bit RF signals to be multiplexed onto a single fiber optic cable. Further, the converter structure may be implemented in a simple structure using a relatively low number of optical cells. As described in further detail, the converter may provide a high resolution of at least 8-10 bits while maintaining a high signal to noise ratio. The converter can provide high spectral efficiency for wavelength division multiplexing (WDM) applications.

Figure 1:
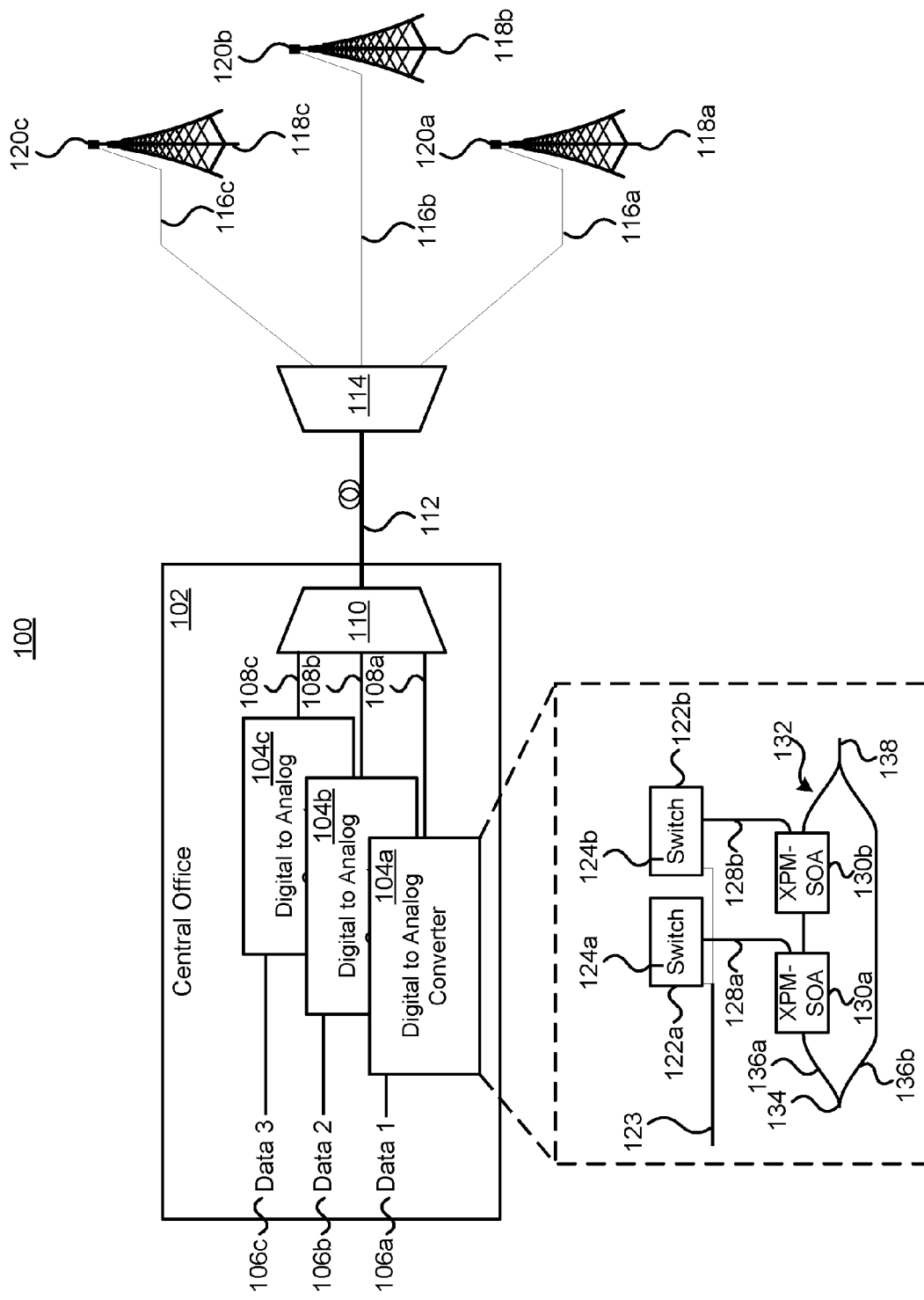
FIG. 1 depicts a radio over fiber transmission system incorporating a digital-electrical to analog-optical converter.

FIG. 1 depicts a radio over fiber (RoF) transmission system 100 incorporating a digital-electrical to analog-optical converter. The RoF system 100 comprises a central office 102 at which digital data is converted into an analog optical signal that can be transmitted over optical cables to remote locations. Although referred to as a central office, the digital-electrical to analog-optical converter may be located at any location where digital-electrical to analog-optical conversion is performed. As depicted, the central office 102 may comprise a plurality of digital-electrical to analog-optical converters 104a-104c (referred to collectively as digital to analog converters 104) that each convert a multi-bit digital electrical signal 106a-106c (referred to collectively as digital-electrical signals 106) to a corresponding analog-optical signal 108a-108c (referred to collectively as analog-optical signals 108). Each of the analog-optical signals 108 may be an amplitude modulated signal at a particular wavelength. If each of the analog-optical signals 108 are at different wavelengths, the plurality of analog-optical signals 108 can be multiplexed into a single output signal by a wavelength multiplexer 110. The output signal, which may comprise a plurality of analog-optical signals multiplexed together, can be transmitted over a fiber optic cable 112. The fiber optic cable 112 may be connected between the multiplexer 110 and a demultiplexer 114. The fiber optic cable 112 may carry the output signal a relatively large distance such as up to 20 km or more. The demultiplexer 114 demultiplexes each of the optical signals 108 output from the digital to analog modulators 104. The demultiplexer 114 may be coupled to a plurality of transmitters 120a-120c (referred to collectively as transmitters 120) by a relatively short length of fiber optic cables 116a-116c (referred to collectively as fiber optic cables 116). The length of the fiber optic cables 116 coupling the demultiplexer 114 to the transmitters 120 may be for example up to 100 m or more. As depicted, each of the transmitters 120 may be located at respective cell sites 118a-118c (referred to collectively as cell sites 118). The cell sites may be located at separate physical locations as depicted in FIG. 1, or may be separate cell sectors located at the same physical location. Each of the transmitters may include an optical detector for converting the analog optical signal to an analog electrical signal for use in driving the transmitter antenna.

Each of the digital to analog converters 104 generates an amplitude modulated analog-optical signal 108 that corresponds to the digital-electrical data signals 106 that comprises a multi-bit digital signal. For example, each of the digital-electrical data signals 106 may comprise 8 or 10 bit signals. Each of the digital to analog converters 104 comprise a plurality of optical switches 122a, 122b (referred to collectively as switches 122). Each of the switches 122 forms part of a light path that is associated with a respective optical amplitude. The switches 122 modulate optical signals, which may be provided to the switches by respective inputs 124a, 124b, according to a particular bit of the digital signal being modulated. The optical amplitude of the optical signal being modulated by the respective switches 122 may correspond to the significance of the bit being modulated. For example in, FIG. 1, the digital to analog modulator is depicted as comprising two switches and as such may modulate a two-bit digital signal. The switch associated with the most significant bit can modulate an optical signal having a normalized amplitude of approximately ½. The switch associated with the least significant bit can modulate an optical signal having a normalized amplitude of approximately ¼. The switches provide corresponding optical bitstreams by switching an optical signal having a normalized optical amplitude corresponding to the bit used in controlling the switching. The switches 122 provide digital optical signals 128a, 128b as depicted in Table 1. As the electrical digital signal varies, each digital optical signal will vary between the associated optical amplitude and an amplitude of 0.

TABLE 1 table depicting switched optical signals corresponding to digital electrical data

| Digital electrical data | Digital optical signal 128a | Digital optical signal 128b |
|---|---|---|
| 00 | 0 | 0 |
| 01 | 0 | ¼ |
| 10 | ½ | 0 |
| 11 | ½ | ¼ |

Although only two switches are depicted, it will be appreciated that the number of switches corresponds to the number of bits in the digital signal. For example, in an 8 bit digital electrical signal 8 switches would be present. The normalized optical amplitude of each light path of the switches, from the switch controlled by the MSB to the LSB, may be for example $$\frac{1}{2^1}, \frac{1}{2^2}, \frac{1}{2^3}, \frac{1}{2^4}, \frac{1}{2^5}, \frac{1}{2^6}, \frac{1}{2^7}, \frac{1}{2^8}.$$

Each of the digital optical signals 128 from the switches 122 may be used to control an amount of phase shift induced in an optical signal by respective cross-phase modulation (XPM) semiconductor optical amplifiers (SOAs) 130a, 130b (referred to collectively as XPM-SOAs 130). As depicted, each of the XPM-SOAs 130 are sequentially arranged in an arm of a Mach-Zehnder interferometer (MZI) structure 132. An optical signal entering an input 134 of the MZI structure 132 is split into two arms 136a, 136b. The optical signal in one of the arms is subjected to phase shifts by the XPM-SOAs 130 and when recombined with the non-phase shifted optical signal from the other arm of MZI structure 132 results in modulation of the amplitude of the resulting output signal. For example, if the signal in one arm is phase shifted by π radians, the resulting optical signal will have 0 amplitude. Each of the XPM-SOAs 130 induce a phase shift in the signal corresponding to an amplitude of the respective digital optical signals 128. Accordingly, the resulting amplitude of the output signal 138 is based on the phase shifts induced by the optical amplitudes of each of the digital optical signals 128 and the amplitudes of each of the digital optical signals 128 corresponds to the digital electrical signal data. Accordingly, the output optical signal is an analog optical signal whose amplitude corresponds to the digital electrical data.

Figure 2:
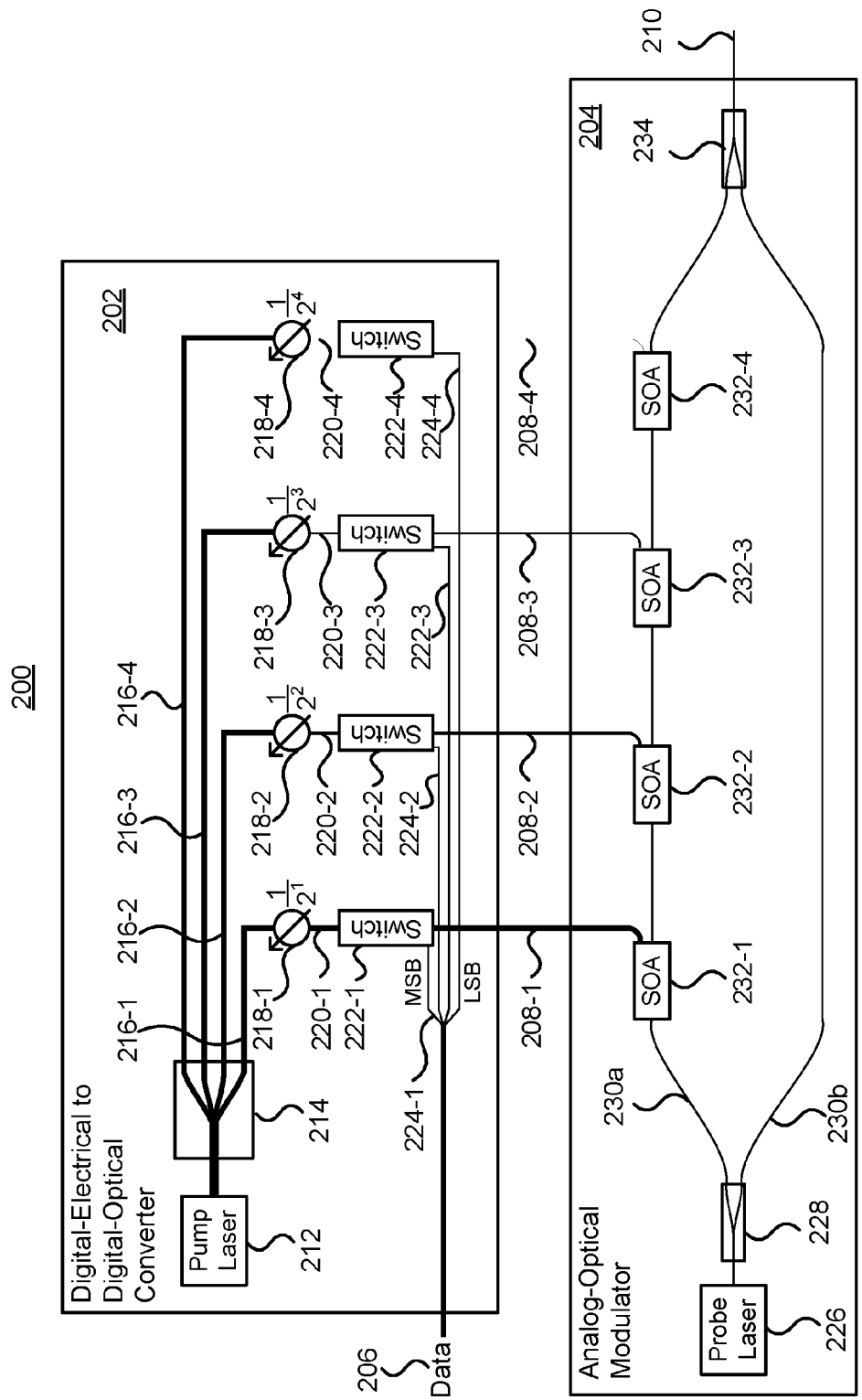
FIG. 2 depicts a digital-electrical to analog-optical converter.

FIG. 2 depicts a digital-electrical to analog-optical converter 200. The digital-electrical to analog-optical converter 200 may modulate an optical signal to provide an analog optical output that corresponds to a digital electrical input. The digital-electrical to analog-optical converter 200 may be utilized as the digital-electrical to analog-optical converters 104 described above with reference to FIG. 1. The digital-electrical to analog-optical converter 200 may comprise a digital-electrical to digital-optical converter 202 that is optically coupled to an analog-optical modulator 204. The digital-electrical to digital-optical converter 202 converts a multi-bit digital data signal 206, comprising individual bit stream signals 224-1-224-4 (referred to collectively as bit stream signals 224), into a plurality of corresponding digital optical signals 208-1-208-4 (referred to collectively as digital optical signals 208). As depicted, the digital-electrical to digital-optical converter 202 comprises a plurality of optical light paths that each modulate a respective optical signal according to a bit stream signal. As depicted in FIG. 2, each light path carries an optical signal 216-1-216-4 (referred to collectively as optical signals 216) that is attenuated by a respective attenuator 218-1-218-4 to a particular amplitude and then modulated, or switched on or off, by respective optical switches 220-1-220-4 that are controlled by respective ones of the bit stream signals 224. Each of the optical signals 216 may be provided to the respective attenuators 218 from an optical splitter 214 that splits an optical signal provided by a light source 212 into the plurality of optical signals 216. The light source 212 is referred to as a pump light source as it is used to provide optical pump signals to the XPM-SOAs 232. The digital optical pump signals 208 of the light paths are provided to an analog-optical modulator 204 or more particularly to XPM-SOAs 232-1-232-4 (referred to collectively as XPM-SOAs 232) of the analog-optical modulator 204. The digital optical signals 208 may be coupled to the analog-optical modulator 204 by optical waveguides and/or fiber optic cables.

The analog-optical modulator 204 comprises a Mach-Zehnder interferometer (MZI) structure. The MZI structure comprises an optical splitter 228 that equally splits an input optical signal, such as from a probe laser 226, into respective arms 230*a*, 230*b* of the MZI structure. One arm 230*a* of the MZI structure comprises a plurality of XPM-SOAs 232-1-232-4 that are sequentially arranged in the arm. Each of the XPM-SOAs induces a phase shift in the optical signal in the arm 230*a* based on an amplitude of a probe signal provided to the XPM-SOAs 232. As depicted the probe signal of the XPM-SOAs 232 are the respective digital optical signals 208 from the digital-electrical to digital-optical converter 202. The resulting phase shift of the optical signal in the arm 230*a* of the MZI structure is a sum of each individual phase shift induced by the individual XPM-SOAs 232. It is assumed that the individual SOAs 232 have the same characteristics and as such the amplitudes of the pump signals are used to control an amount of induced phase shift. As described further with reference 9, it is possible for the characteristics of the individual SOAs to vary in order to provide varying amounts of phase shift for the same amplitude of the pump signal. The MZI structure further comprises an optical combiner 234 that combines the optical signal from the two arms 230*a*, 230*b* to provide an optical signal 210 whose amplitude is modulated according to digital data signal 206.

Figure 3:
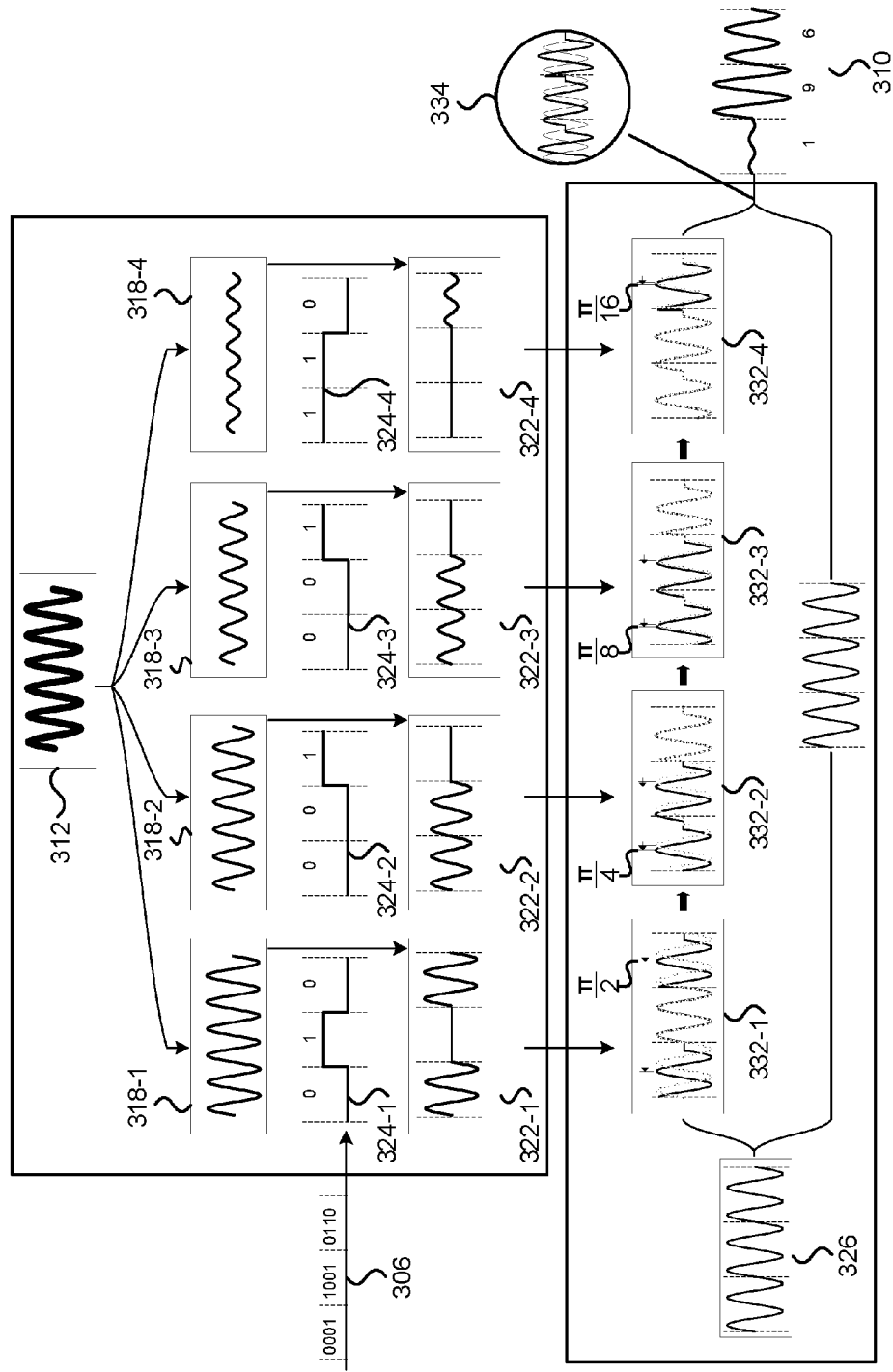
FIG. 3 depicts signals in a digital-electrical to analog-optical converter.

FIG. 3 depicts signals in a digital-electrical to analog-optical converter, such as the digital-electrical to analog-optical converter 200. Digital electrical data 306 is depicted as a three sequential samples of 4-bit data signals. The first digital signal sample represents a value of '6', the second digital signal sample represents a value of '9' and the third digital signal sample represents a value of '1'. The laser of the digital electrical to digital optical converter provides an optical signal 312 which is split into 4 equal optical pump signals which are then attenuated by the respective attenuators to provide attenuated optical signals 318-1-318-4 (referred to collectively as attenuated optical signals 318). The normalized amplitude of the attenuated optical pump signals is set in order to induce a desired phase shift from the XPM-SOAs. For example, the highest amplitude may be set to provide a phase shift of π/2 and each subsequent amplitude may be set to provide a phase shift of ½ the previous phase shift. For example, the second highest amplitude is set to provide a phase shift of π/4, the third highest amplitude is set to provide a phase shift of π/8, etc. The XPM-SOAs may have a linear response between the amplitude and the resulting phase shift. Accordingly, the amplitudes of the attenuated optical signal may be set according to $$\frac{1}{2^x},$$

where x is an index of a bit controlling the switch associated with the optical signal with the index of the MSB is 1.

As depicted, the digital electrical data 306 comprises respective bit streams, 324-1-324-4. The MSB bit stream 324-1 controls a switch associated with the highest amplitude attenuated optical signal 318-1. Each of the switches will switch the optical output on or off according to the associated bit stream. It is noted that the control of the switch may be inverted so that an digital bit of '1' may be associated with turning off the switch, while a digital bit of '0' may be associated with turning on the switch. Accordingly, when the bit streams 324 control the switches, the resulting digital optical signals 322-1-322-4 will vary between an optical signal have an amplitude corresponding to the associated attenuated optical signals and a zero amplitude.

The optical digital signals 322 control a phase shift induced by each of the XPM-SOAs. A laser may provide an optical signal 326 at a particular frequency. The optical signal 326 is split into two arms of the MZI structure. An optical signal in a first arm, depicted as the top arm in FIG. 3, is subjected to phase-shifts under control of the digital optical signals 322 while a phase of the optical signal in a second arm, depicted as the bottom arm in FIG. 3, is not shifted. Each XPM-SOA induces a phase shift of the input optical signal that is proportional to the amplitude of the digital optical signals. When the digital optical signals have an amplitude resulting from the switch being 'on', corresponding to a '0' electrical digital bit, the XPM-SOA will induce a corresponding phase shift, for example from π/2 to π/6, in the optical signal in the first arm. When the digital optical signals have an amplitude resulting from the switch being 'off' corresponding to a '1' electrical digital bit, the XPM-SOA does not induce a phase shift in the first arm. The phase shifted optical signal is recombined with an non-shifted optical signal, as depicted in overlaid signals 334, resulting in an output optical signal 310 having a modulated amplitude. The combination of the phase shifts from the XPM-SOAs 332 results in an amplitude modulated signal 310 corresponding to the digital data.

As described above, the digital electrical signal of bit streams of '0's and '1's may be converted to corresponding digital optical signals having a normalized amplitude of approximately $$\frac{1}{2^x},$$

where x is a bit value from 1 to the number of bits, and a normalized amplitude of approximately 0. The digital optical signals may then be used to induce corresponding phase shifts in an optical signal, resulting in modulation of an optical signals amplitude. By converting the digital electrical signal to optical signals, the RF electrical signals may be physically separated from each other in order to prevent possible RF crosstalk between the signals.

Figure 4:
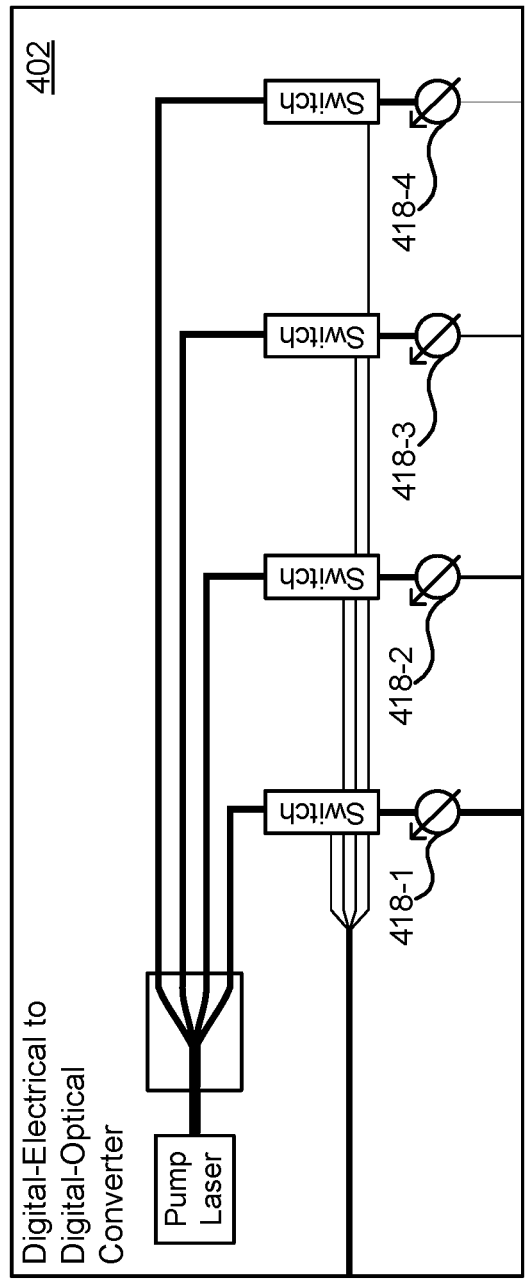
FIG. 4 depicts a digital electrical to digital optical converter.

FIG. 4 depicts a digital-electrical to digital-optical converter 402. The digital-electrical to digital-optical converter 402 is substantially similar to the digital-electrical to digital-optical converter 202 described above and as such, only differences are described. The individual attenuators 218 in the digital-electrical to digital-optical converter 202 were arranged upstream of the optical switches 222, that is between the switches 222 and the optical source 412. In contrast, the individual attenuators 418-1-418-4 (referred to collectively as attenuators 418) are located downstream from the switches 222. Accordingly, the switches 222 are coupled to the split outputs 216 of the optical source 212. The attenuators 418 provide the same attenuation as the attenuators 222 described above. Although the attenuators 418 are located downstream of the switches, the resulting digital optical signals correspond to those described above with regard to FIGS. 2 and 3.

Figure 5:
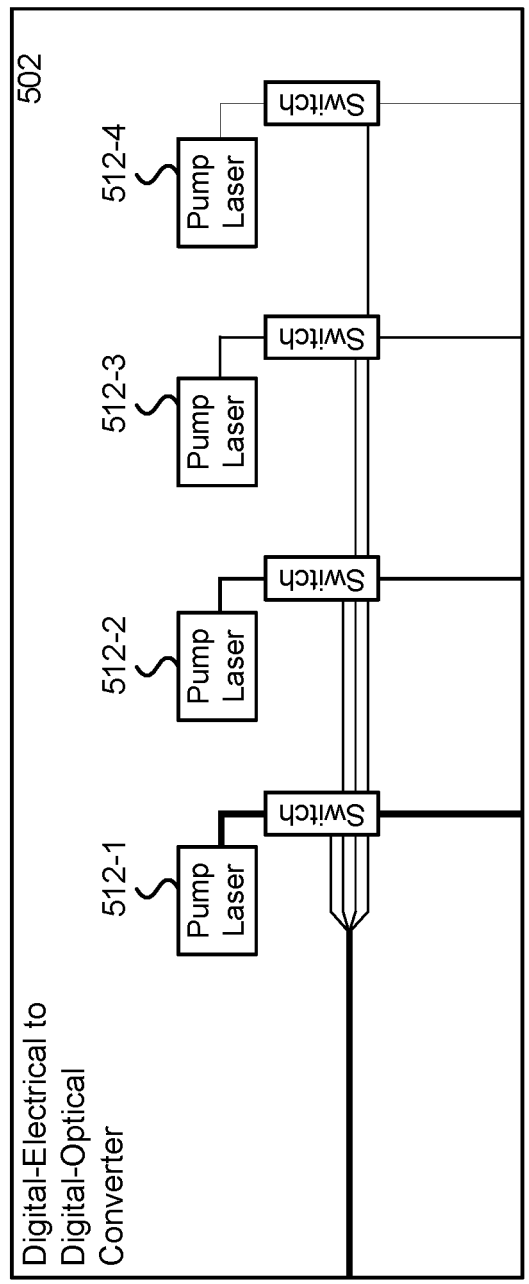
FIG. 5 depicts a further digital-electrical to digital-optical converter.

FIG. 5 depicts a further digital-electrical to digital-optical converter 502. The digital-electrical to digital-optical converter 502 is substantially similar to the digital-electrical to digital-optical converters 202 and 402 described above and as such, only differences are described. The digital-electrical to digital-optical converters 202, 402 each included attenuators for attenuating an optical signal in order to provide the optical signals at the required amplitudes to induce the desired phase shifts in the analog optical modulator. In contrast to the digital-electrical to digital-optical converters 202, 402, the digital-electrical to digital-electrical to digital-optical converter comprises a plurality of individual laser sources 512-1-512-4 (referred to collectively as laser sources 512) that output an optical signal at a the desired amplitude.

Figure 6:
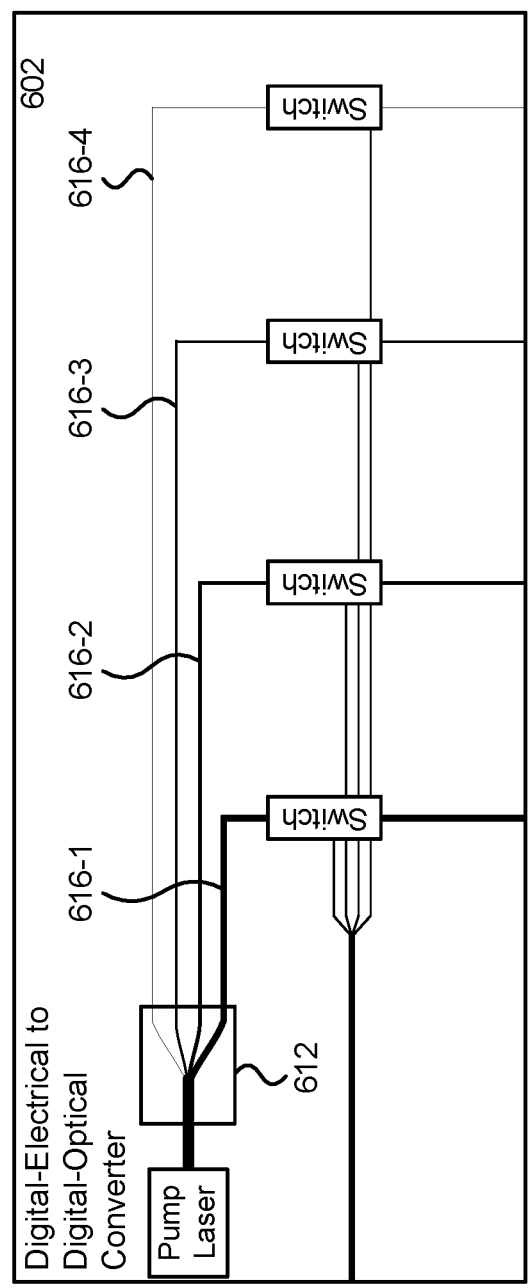
FIG. 6 depicts a further digital-electrical to digital-optical converter.

FIG. 6 depicts a further digital-electrical to digital-optical converter 602. The digital-electrical to digital-optical converter 602 is substantially similar to the digital-electrical to digital-optical converters 202, 402 and 502 described above and as such, only differences are described. The digital-electrical to digital-optical converters 202, 402, each included attenuators for attenuating an optical signal in order to provide the optical signals at the required amplitudes to induce the desired phase shifts in the analog optical modulator, while the digital-electrical to digital-optical converter 502 used separate optical sources 512 to provide the signals at the required amplitudes. The digital-electrical to digital-optical converter 602 may comprise an optical splitter 612 that splits an optical pump signal into the required optical signals. However, rather than providing equal splitting between all of the signals, the optical splitter 612 may provide unequal splitting so that each of the split signals 616-1-616-4 have the appropriate amplitude for inducing the desired phase shift in the analog optical modulator. The splitter 612 splits the input optical pump signal into a plurality of individual optical pump signals, each with different amplitudes. As an example, the amplitudes may have a binary relationship, with the amplitude of each subsequent optical pump signal being twice the amplitude of the previous signal's amplitude. Continuing with the binary splitting example, the optical pump signal 616-4 may have an ampltiude of $$\frac{1}{2^4}$$

of the input amplitude, 616-3 may have an amplitude of $$\frac{1}{2^3}$$

of the input amplitude, 616-2 may have an amplitude of $$\frac{1}{2^2}$$

of the input amplitude and 616-1 may have an amplitude of $$\frac{1}{2^1}$$

the input amplitude.

Although the digital-electrical to digital-optical converters 202, 402, 502, 602 described above included optical sources, it is possible for the optical sources to be provided externally from the digital-electrical to digital-optical converters 202, 402, 502, 602 and coupled through a plurality of optical inputs.

Figure 7:
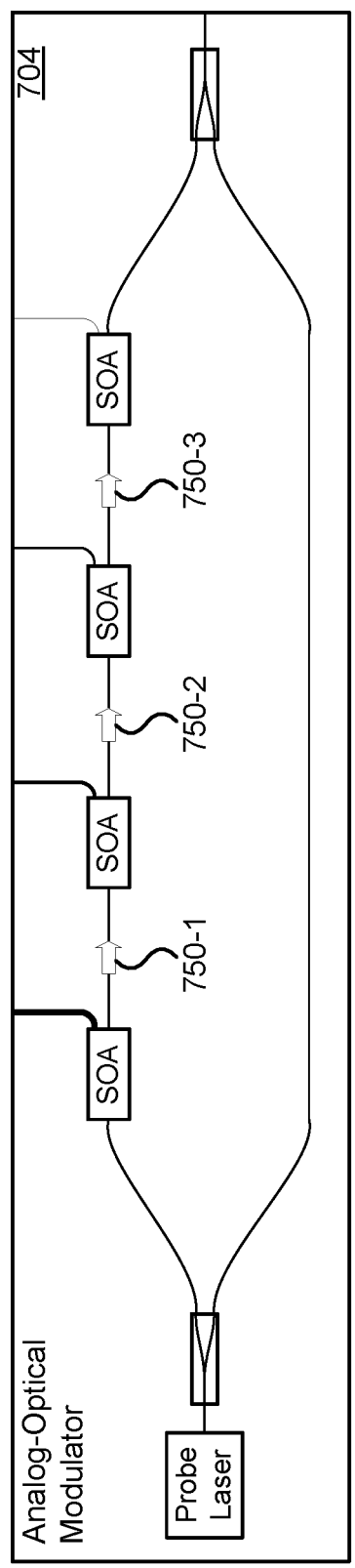
FIG. 7 depicts an analog-optical modulator for use in a digital-electrical to analog-optical converter.

FIG. 7 depicts an analog-optical modulator 704 for use in a digital-electrical to analog-optical converter. The analog-optical modulator 704 is substantially similar to the analog-optical modulator 204 and as such, only the differences are described in further detail. As depicted, each of the XPM-SOAs are counter-propagating SOAs. The optical modulator 704 includes a plurality of optical isolators 750-1, 750-2, 750-3 (referred to collectively as optical isolators 750). Each of the optical isolators 750 are located between XPM-SOAs and allows the forward propagating optical signal to pass downstream but prevents any optical signal from propagating backward between SOAs. The optical isolators 750 may prevent any pump signal from an upstream SOA from reaching a downstream SOA.

Figure 8:
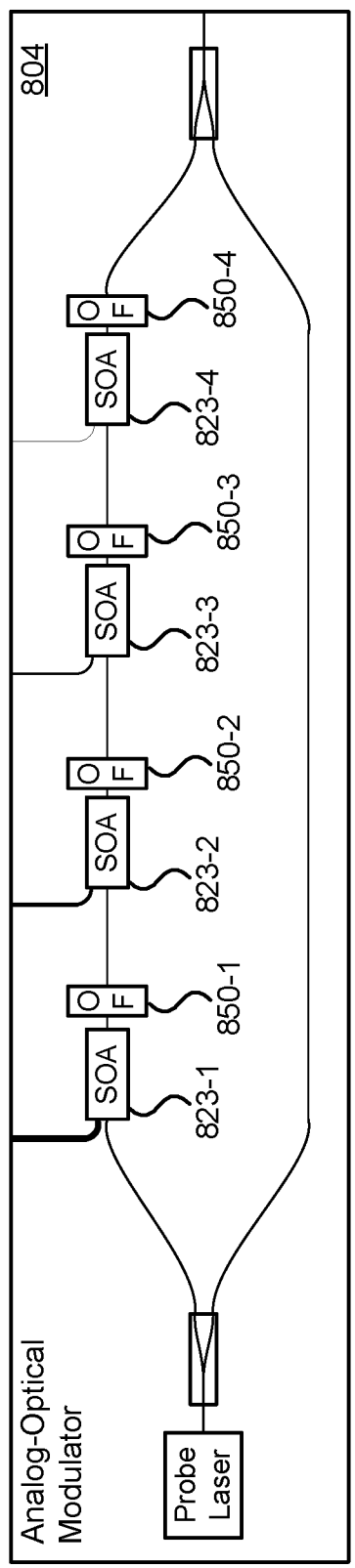
FIG. 8 depicts a further analog optical modulator for use in a digital-electrical to analog-optical converter.

FIG. 8 depicts an analog-optical modulator 804 for use in a digital-electrical to analog-optical converter. The analog-optical modulator 804 is substantially similar to the analog-optical modulators 204, 704 and as such, only the differences are described in further detail. The analog-optical modulators 204, 704 described above included counter-propagating SOAs, however, the analog-optical modulator 804 utilizes co-propagating SOAs 823-1, 823-2, 823-3, 823-4 (referred to collectively as SOAs 823). The analog-optical modulator 804 further includes optical filters 850-1, 850-2, 850-3, 850-4 (referred to collectively as optical filters 850). Each of the optical filters 850 is located downstream from respective SOAs 850. The optical filters 850 filter out any of the co-propagating pump optical signals passing through the SOAs 823.

Figure 9:
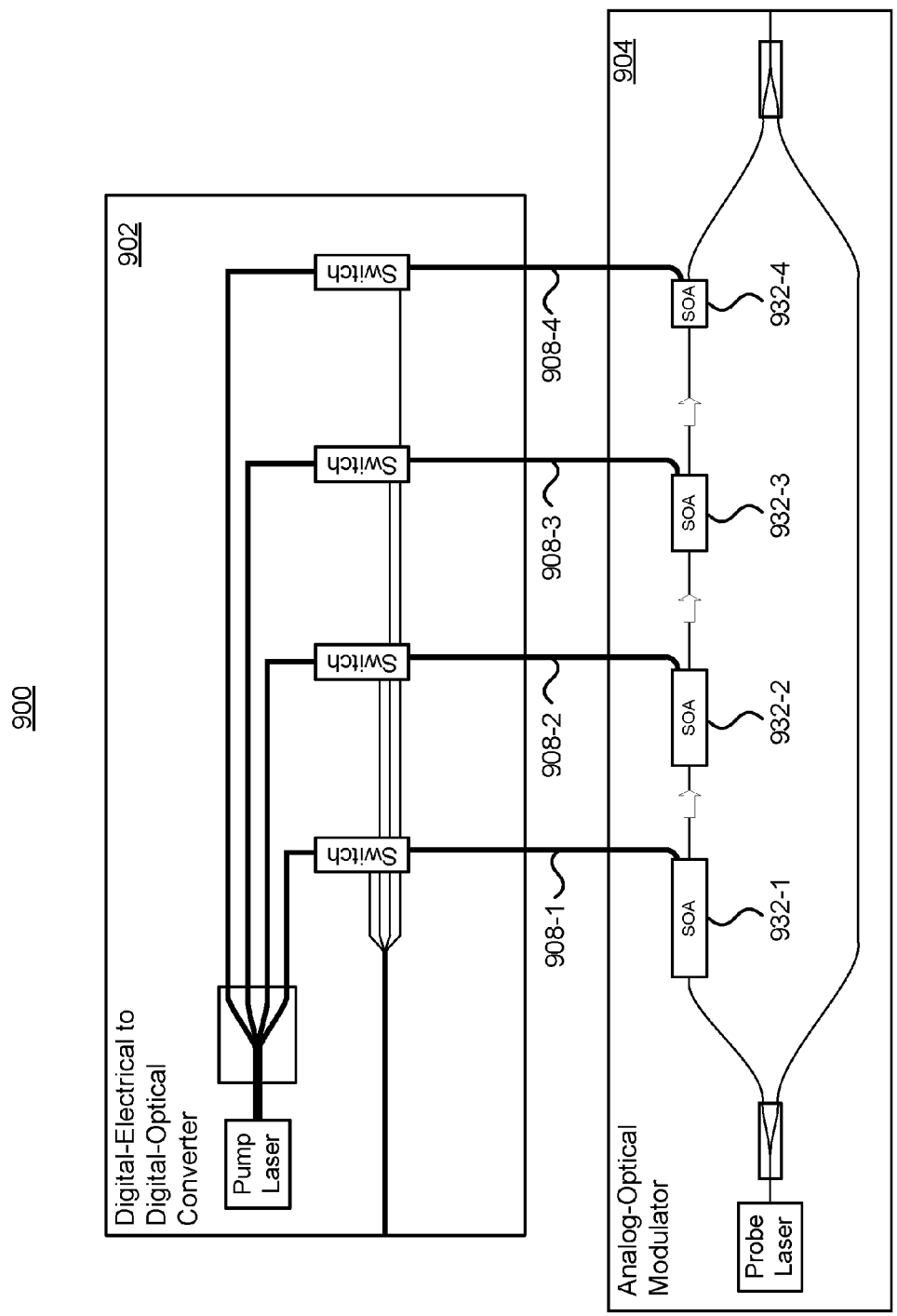
FIG. 9 depicts a further digital-electrical to analog-optical converter.

FIG. 9 depicts a further digital-electrical to analog-optical converter 900. The digital-electrical to analog-optical converter 900 is substantially similar to the digital-electrical to analog-optical converter 200 described above and as such, only the differences are described in further detail. The analog-optical converter 200 used varying amplitudes of pump signals to induce different phase shifts in the different SOAs. In contrast, the digital-electrical to analog-optical converter 900 uses varying SOAs to induce the different phase shifts according to digital optical pump signals 908-1-908-4 (referred to collectively as optical pump signals 908) that all have the same amplitudes. The digital-electrical to digital-optical converter 902 is substantially similar to those described above; however, all of the optical signals being modulated by the switches may have the same amplitude. As such, the digital-electrical to digital-optical converter 902 may not require any attenuators. The equal amplitude optical pump signals 908 are provided to respective XPM-SOAs 932-1-932-4 (referred to collectively as XPM-SOAs 932) that induce varying amounts of phase shift for the same amplitude of pump signal. That is, the modulating efficiency of the individual SOAs may be varied so that each provides the appropriate phase shift, such as $$\frac{\pi}{2^n}$$

where n is representative of the bit significance modulated by the particular SOA. For example, the phase shift induced by an SOA may depend upon the amplitude of the pump signal and the length of the SOA. If the amplitude remains the same, the amount of phase shift induced by the different SOAs may be controlled by the length of the SOAs. For example, the smallest phase shift may be provided by an SOA having a particular length L. The other SOAs may have lengths of 2L, 4L, 8L, etc. Although the length may control the efficiency of the SOAs, it is possible to vary other characteristics of the individual SOAs in order to provide the desired phase shifts. For example, non-linear coefficients of an SOA may be used to control its modulation efficiency in addition to, or as an alternative to, the SOA length.

Figure 10:
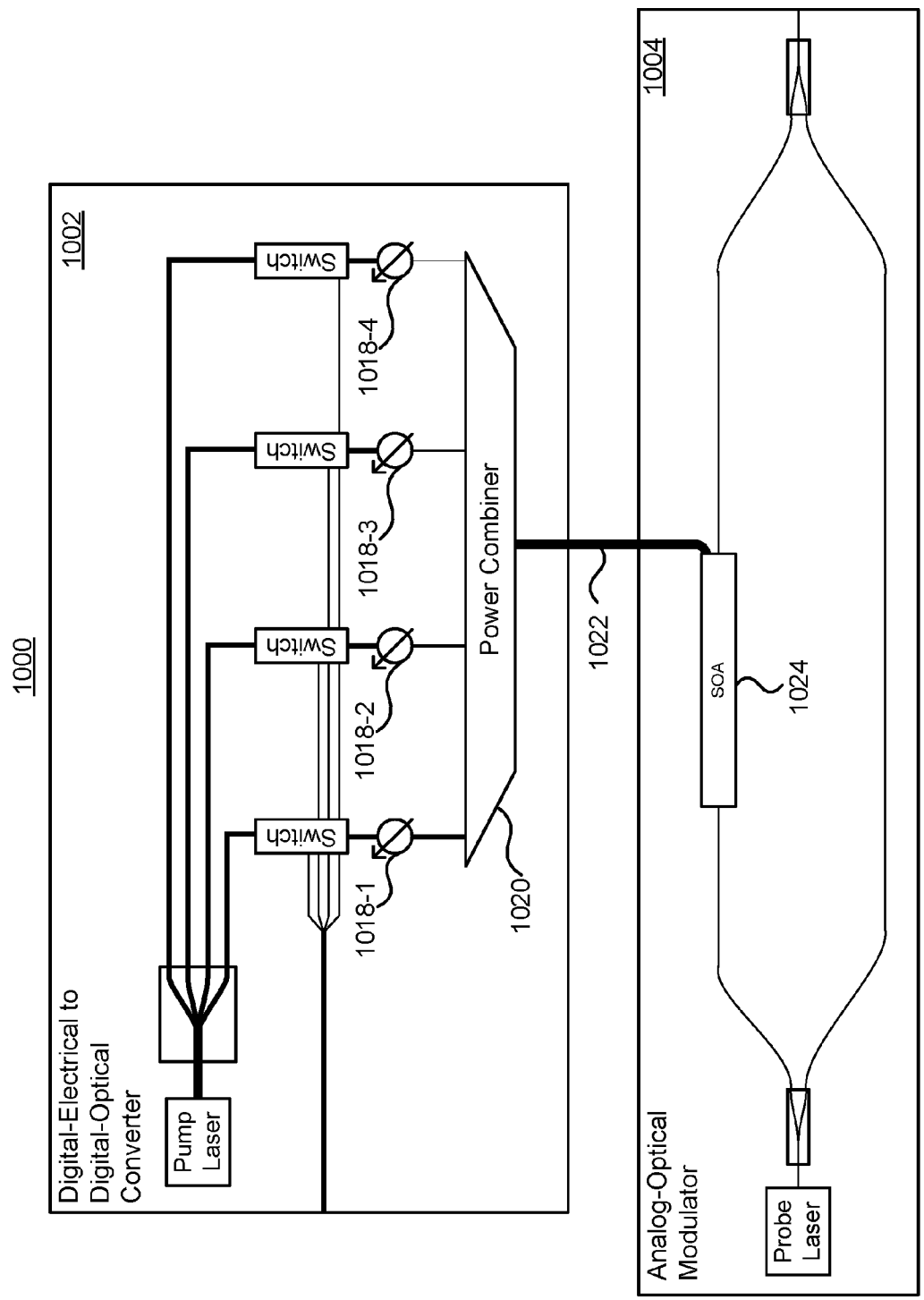
FIG. 10 depicts a further digital-electrical to analog-optical converter.

FIG. 10 depicts a further digital-electrical to analog-optical converter 1000. The digital-electrical to analog-optical converter 1000 is substantially similar to the digital-electrical to analog-optical converters 200, 900 described above, and as such, only the differences are described in further detail. The digital-electrical to analog-optical converter 1000 comprises a single XPM SOA 1032 that is controlled by an optical pump signal 1008 that is an optical combination of the plurality of individual pump signals. The individual pump signals are combined at an optical combiner 1020. The amplitude of the single pump signal 1008 is equal to the sum of the amplitudes of the individual pump signals. Accordingly, the total phase shift induced by the single SOA 1024 is the same as if each individual pump single controlled a respective SOA.

Figure 11:
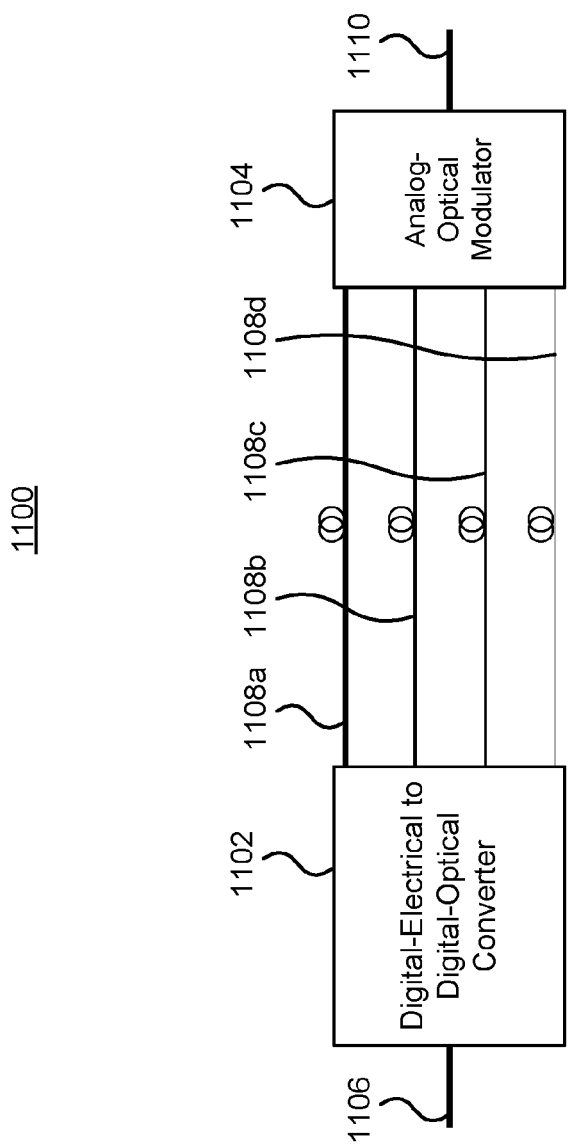
FIG. 11 depicts a further digital-electrical to analog-optical converter.

FIG. 11 depicts a radio over fiber transmission system 1100 incorporating digital-electrical to analog-optical converter 1100. The system 1100 comprises a digital-electrical to digital-optical converter 1102, which converts a multi-bit digital electrical signal 1106 to a plurality of digital optical signals 1108a-1108d. Each one of the digital-optical signals 1108a-1108d is coupled to an analog-optical modulator that modulates an analog-optical signal according to the digital-optical signals to provide the modulated analog-optical output signal 1110. The digital-electrical to digital-optical converter 1102 may be coupled to the analog-optical modulator 1104 by a plurality of fiber optic cables. The length of the cables may vary in order to allow the digital electrical to digital optical converter 1102 to be remotely located from the analog-optical modulator 1104.

The above has described various functionality provided by various systems or components. Although specific embodiments are described herein, it will be appreciated that modifications may be made to the embodiments without departing from the scope of the current teachings. Accordingly, the scope of the appended claims should not be limited by the specific embodiments set forth, but should be given the broadest interpretation consistent with the teachings of the description as a whole.

What is claimed is:

1. A digital-electrical to analog-optical converter for converting an input digital electrical signal into an output analog optical signal, the converter comprising:
   a plurality of light paths, wherein each light path is configured for modulating a respective optical pump signal according to a respective bit of the input digital electrical signal; and
   a Mach-Zehnder interferometer comprising at least one cross-phase modulation (XPM) semiconductor optical amplifier (SOA) coupled to the plurality of light paths to induce an optical phase shift between arms of the Mach Zehnder interferometer for providing the output analog optical signal.

2. The digital-electrical to analog-optical converter of claim 1, comprising an optical power combiner coupled to the plurality of light paths for combining the plurality of modulated optical pump signals to a single optical pump signal, wherein the at least one XPM-SOA is coupled to the single optical pump signal.

3. The digital-electrical to analog-optical converter of claim 1, wherein the at least one XPM-SOA comprises a plurality of XPM-SOAs, wherein each one of the XPM-SOAs is coupled to a respective one of the plurality of modulated optical pump signals.

4. The digital-electrical to analog-optical converter of claim 1, wherein each one of the plurality of light paths corresponds to a bit significance of a bit of the input digital electrical signal, each light path having an optical switch controllable by a bit of the input digital electrical signal of the corresponding bit significance of the light path for modulating the respective optical pump signal.

5. The modulator of claim 4, further comprising a light source for providing the plurality of optical pump signals.

6. The modulator of claim 5, further comprising an optical splitter for splitting an optical beam of the light source into the plurality of optical pump signals.

7. The modulator of claim 6, wherein the optical splitter is configured for splitting the optical beam with power splitting ratios corresponding to the bit significance of the corresponding light path.

8. The modulator of claim 4, further comprising a plurality of optical attenuators, wherein each optical attenuator is disposed in a respective one of the plurality of light paths for attenuating the respective optical pump signal to a level corresponding to the bit significance of the light path.

9. The modulator of claim 5, wherein the light source comprises a plurality of laser diodes each of the laser diodes coupled to a respective one of the plurality of light paths, wherein each laser diode has an output power level corresponding to the bit significance of the corresponding light path.

10. The modulator of claim 3, wherein each one of the XPM-SOAs has a phase modulation efficiency corresponding to the bit significance of the corresponding light path.

11. The modulator of claim 1, further comprising:
a digital-electrical to digital-optical converter comprising the plurality of light paths; and
a digital-optical to analog-optical modulator comprising the at least one XPM SOA.

12. The modulator of claim 11, wherein the digital-electrical to digital-optical converter is optically coupled to the digital-optical to analog-optical modulator via at least one fiber optic cable or waveguide.

13. The modulator of claim 1, wherein each of the at least one XPM-SOA is located in a single arm of the arms of the Mach-Zehnder interferometer.

14. The modulator of claim 1, wherein each of the at least one XPM-SOA is a counter-propagating XPM-SOA.

15. The modulator of claim 14, further comprising an optical isolator located between each one of the at least one XPM-SOA.

16. The modulator of claim 1, wherein each of the at least one XPM-SOA is a co-propagating XPM-SOA.

17. The modulator of claim 16, further comprising an optical filter located downstream of each one of the at least one XPM-SOA for filtering a wavelength of the optical pump signals.

18. The modulator of claim 1, wherein each one of the at least one XPM-SOA induces a respective phase shift in a probe optical signal based on the respective amplitude of the associated modulated optical pump signal.

19. The modulator of claim 16, wherein a combined phase shift induced by the at least one XPM-SOAs is between 0 and π.

20. The modulator of claim 19, wherein the phase shift induced by the at least one XPM-SOA associated with the respective light path is approximately $$\frac{\pi}{2^{m-n}},$$

where m is a number of digital bits and n is the bit significance of the respective light path with n=0 being a least significant bit and n=m−1 being a most significant bit.

21. The modulator of the claim 1, further comprising a light source providing the optical probe signal to the MZI structure.

22. A radio over fiber (RoF) system for transmitting at least one analog radio-frequency signal to a transmission location, the RoF system comprising:
a plurality of digital-electrical to analog-optical converters, each of the digital-electrical to analog-optical converters comprising:
a plurality of light paths, wherein each light path is configured for modulating a respective optical pump signal according to a respective bit of the input digital electrical signal; and
a Mach-Zehnder interferometer comprising at least one cross-phase modulation (XPM) semiconductor optical amplifier (SOA) coupled to the plurality of light paths to induce an optical phase shift between arms of the Mach Zehnder interferometer for providing the output analog optical signal;
a wavelength multiplexer for multiplexing the plurality of output analog optical signals from the plurality of digital-electrical to analog-optical converters into a multiplexed optical signal;
a wavelength demultiplexer for demultiplexing the multiplexed optical signal into the plurality of output analog optical signals; and
an optical fiber for optically coupling the wavelength multiplexer to the wavelength demultiplexer for carrying the multiplexed optical signal.

23. The RoF system of claim 22, wherein the optical fiber is between 500 m and 20 km in length.

24. The RoF system of claim 23, comprising between 2 and 128 digital-electrical to analog-optical converters.

* * * * *

UNITED STATES PATENT AND TRADEMARK OFFICE
CERTIFICATE OF CORRECTION

PATENT NO. : 9,768,877 B2
APPLICATION NO. : 15/004298
DATED : September 19, 2017
INVENTOR(S) : Irfan Muhammed Fazal It is certified that error appears in the above-identified patent and that said Letters Patent is hereby corrected as shown below:

On the Title Page

After "Assignee: Huawei Technologies Co., Ltd.," "Guangdon (CN)" should read --Guangdong (CN)--

In the Drawings

Sheet 2, Fig. 2: there should be lines illustrating the connection between 218-4 to 222-4 and between 222-4 to 232-4
Sheet 9, Fig. 9: remove reference number 904
Sheet 10, Fig. 10: remove reference numbers 1004, 1018-1-1018-4

In the Specification

Column 6, Line 12: "For example in, FIG. 1," should be --For example, in FIG. 1,--
Column 6, Line 42: "digital electrical signal 8" the number 8 should not be bold
Column 7, Line 31: "to a particular amplitude and then modulated," should read --to a particular amplitude 220-1-220-4 and then modulated,--
Column 7, Line 33: "optical switches 220-1-220-4" should read --optical switches 222-1-222-4--
Column 8, Line 9: "as a three sequential samples" should read --as three sequential samples--
Column 8, Line 43: "inverted so that an digital bit" should read --inverted so that a digital bit--
Column 9, Line 16: "x is a bit value" should read --x is a bit index value--
Column 9, Line 52: "the digital-electrical to digital-electrical to digital-optical converter" should read --the digital-electrical to digital-optical converter--
Column 9, Line 55: "optical signal at a the desired amplitude" should read --optical signal at a desired amplitude--
Column 9, Line 63: "included attenuators for attenuating" should read --include attenuators for attenuating--
Column 11, Line 61: "comprises a single XPM SOA 1032" should read --comprises a single XPM SOA 1024--

Signed and Sealed this
Twentieth Day of February, 2018

Andrei Iancu
*Director of the United States Patent and Trademark Office*

CERTIFICATE OF CORRECTION (continued)
U.S. Pat. No. 9,768,877 B2

Column 11, Line 62: "an optical pump signal 1008" should read --an optical pump signal 1022--
Column 11, Line 65: "the single pump signal 1008" should read --the single pump signal 1022--
Column 12, Line 4: "incorporating digital-electrical to analog-optical converter" should read --incorporating a digital-electrical to analog-optical converter--
Column 12, Line 18: "described various functionality provided" should read --described various functionalities provided--